US009318123B2

(12) United States Patent
Sohn et al.

(10) Patent No.: US 9,318,123 B2
(45) Date of Patent: Apr. 19, 2016

(54) APPARATUS AND METHOD FOR REPRODUCING SOUND, AND METHOD FOR CANCELING A FEEDBACK SIGNAL

(75) Inventors: Jun-il Sohn, Yongin-si (KR); Yoon-seo Koo, Seoul (KR); Young-cheol Park, Wonju-si (KR); Dong-wook Kim, Seoul (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 1051 days.

(21) Appl. No.: 13/282,835

(22) Filed: Oct. 27, 2011

(65) Prior Publication Data

US 2012/0219162 A1    Aug. 30, 2012

(30) Foreign Application Priority Data

Feb. 25, 2011    (KR) .......................... 10-2011-0017294

(51) Int. Cl.
  A61F 11/06    (2006.01)
  G10L 21/0216    (2013.01)
  H04M 9/08    (2006.01)

(52) U.S. Cl.
  CPC ........... G10L 21/0216 (2013.01); H04M 9/082 (2013.01)

(58) Field of Classification Search
  CPC ........ H04R 3/002; H04R 3/02; H04R 25/453; G10L 21/0216
  See application file for complete search history.

(56) References Cited

U.S. PATENT DOCUMENTS

| 2003/0053647 | A1* | 3/2003 | Kates | 381/318 |
| 2006/0140429 | A1 | 6/2006 | Klinkby et al. | |
| 2006/0291681 | A1 | 12/2006 | Klinkby et al. | |
| 2009/0067651 | A1* | 3/2009 | Klinkby et al. | 381/313 |
| 2009/0196445 | A1* | 8/2009 | Elmedyb et al. | 381/318 |
| 2010/0232634 | A1* | 9/2010 | Boldt | 381/318 |
| 2011/0064253 | A1* | 3/2011 | Gran et al. | 381/312 |

FOREIGN PATENT DOCUMENTS

| JP | 2010-178330 | 8/2010 |
| KR | 10-2005-0119758 A | 12/2005 |

OTHER PUBLICATIONS

Collomb, Cedrick. "Burg's Method, Algorithm and Recursion." (2009): 1-11. Web.*
Mathews, V. John, and Scott C. Douglas. Adaptive Filters. 2003. 1-48. Web.*
Lee, Sangmin; Kim, Inyoung; Park, Youngcheol. "An Efficient Feedback Canceler for Hearing Aids Based on Approximated Affine Projection." ICIC 2006, LNBI 4115, pp. 711-720, 2006.*
Lee, Haeng-Woo, "A Feedback and Noise Cancellation Algorithm of Hearing Aids Using Adaptive Beamforming Method," vol. 35, No. 1, pp. 96-102 (7 pages).

* cited by examiner

*Primary Examiner* — Joseph Saunders, Jr.
*Assistant Examiner* — James Mooney
(74) *Attorney, Agent, or Firm* — NSIP Law

(57) ABSTRACT

Provided are a method and apparatus for reproducing sound. A sound signal may be generated by receiving sound around the apparatus. An output signal may be generated by performing a process according to functions of the apparatus on a residual signal obtained by canceling a feedback signal from the sound signal.

17 Claims, 8 Drawing Sheets

APPARATUS AND METHOD FOR REPRODUCING SOUND, AND METHOD FOR CANCELING A FEEDBACK SIGNAL

CROSS-REFERENCE TO RELATED APPLICATION(S)

This application claims the benefit under 35 U.S.C. §119 (a) of Korean Patent Application No. 10-2011-0017294, filed on Feb. 25, 2011, in the Korean Intellectual Property Office, the entire disclosure of which is incorporated herein by reference for all purposes.

BACKGROUND

1. Field

The following description relates to an apparatus and method for reproducing sound, and a method of canceling a feedback signal in an apparatus for reproducing sound.

2. Description of the Related Art

An apparatus for reproducing sound may reproduce sound that may be heard by a user. Examples of such an apparatus not only include an audio device for reproducing sound, such as an MP3 player or a stereo player, but also a hearing aid for recognizing, amplifying, and reproducing surrounding sound, and also a telephone or repeater for reproducing external sound.

A feedback signal that is generated when sound reproduced by the apparatus is again input to the apparatus may be very unpleasant to the user. Also, a maximum gain value of the apparatus may be limited by the feedback signal.

SUMMARY

In one general aspect, there is provided an apparatus for reproducing sound, the apparatus including a sound signal generator configured to generate a sound signal by receiving sound from around the apparatus, a signal processor configured to perform a process according to functions of the apparatus, on a residual signal that is obtained by canceling a feedback signal from the sound signal, a coefficient determiner configured to determine a linear prediction coefficient that is adaptively adjusted according to the residual signal, a first linear predictor configured to output a first prediction signal by linearly predicting the residual signal according to the determined linear prediction coefficient, a second linear predictor configured to output a second prediction signal by linearly predicting the sound signal that is processed by the signal processor, according to the determined linear prediction coefficient, and a feedback signal canceler configured to estimate a path of the feedback signal according to an algorithm for canceling a feedback signal using the first and second prediction signals, and to cancel the feedback signal from the sound signal generated by the sound signal generator using the estimated path of the feedback signal.

The algorithm for canceling the feedback signal may comprise a pseudo affine projection (PAP) algorithm.

The feedback signal canceler may comprise a feedback signal estimator configured to estimate the path of the feedback signal using the first and second prediction signals, a feedback signal extractor configured to extract the feedback signal from the sound signal that is processed by the signal processor, using the estimated path of the feedback signal, and a residual signal generator configured to generate the residual signal by canceling the extracted feedback signal from the sound signal generated by the sound signal generator.

The feedback signal extractor may be an adaptive filter that updates a coefficient according to the path of the feedback signal estimated by the feedback signal estimator.

At least one of the coefficient determiner, the first linear predictor, and the second linear predictor may comprise a lattice-based linear predictor.

The first linear predictor may be configured to output the first prediction signal by considering an a priori error.

The coefficient determiner may be configured to determine the linear prediction coefficient according to a Burg algorithm.

The apparatus may further comprise a convergence speed adjustor configured to adaptively adjust a convergence speed of the feedback signal extractor according to an autocorrelation of the residual signal.

The convergence speed adjustor may be configured to adjust a convergence speed using a ratio of a first autocorrelation at a first time difference to a second autocorrelation at a second time difference.

The convergence speed adjustor may be configured to adjust a convergence speed using a sigmoid function according to the ratio of the first autocorrelation at the first time difference to the second autocorrelation at the second time difference.

In another aspect, there is provided a method of reproducing sound in an apparatus for reproducing sound, the method including generating a sound signal by receiving sound from around the apparatus, generating an output signal by performing a process according to functions of the apparatus, on a residual signal that is obtained by canceling a feedback signal from the sound signal, determining a linear prediction coefficient that is adaptively adjusted according to the residual signal, generating a first prediction signal by linearly predicting the residual signal according to the determined linear prediction coefficient, generating a second prediction signal by linearly predicting the output signal according to the determined linear prediction coefficient, estimating a path of the feedback signal according to an algorithm for canceling a feedback signal using the first and second prediction signals, and canceling the feedback signal from the sound signal using the estimated path of the feedback signal.

The algorithm for canceling the feedback signal may comprise a pseudo affine projection (PAP) algorithm.

The canceling of the feedback signal may comprise extracting the feedback signal from the output signal using the estimated path of the feedback signal, and generating the residual signal by canceling the extracted feedback signal from the sound signal.

At least one of the determining of the linear prediction coefficient, the generating of the first prediction signal, and the generating of the first prediction signal may be performed using a lattice-based linear predictor.

The generating of the first prediction signal may be performed using a lattice-based linear predictor by considering an a priori error.

The determining of the linear prediction coefficient may be performed according to a Burg algorithm.

The extracting of the feedback signal may be performed using an adaptive filter, and the method may further comprise adaptively adjusting a convergence speed of the adaptive filter according to an autocorrelation of the residual signal.

In another aspect, there is provided a method of canceling a feedback signal, the method including determining a linear prediction coefficient that is adaptively adjusted according to an input signal of an apparatus for reproducing sound, generating a first prediction signal by linearly predicting the input signal using the determined linear prediction coefficient, generating a second prediction signal by linearly predicting an output signal of the apparatus using the determined linear prediction coefficient, estimating a path of a feedback signal according to an algorithm for canceling a feedback signal using the first and second prediction signals, and canceling the feedback signal from the input signal using the estimated path of the feedback signal.

In another aspect, there is provided a computer-readable storage medium having stored therein program instructions to cause a processor to implement a method of reproducing sound in an apparatus for reproducing sound, the method including generating a sound signal by receiving sound from around the apparatus, generating an output signal by performing a process according to functions of the apparatus, on a residual signal that is obtained by canceling a feedback signal from the sound signal, determining a linear prediction coefficient that is adaptively adjusted according to the residual signal, generating a first prediction signal by linearly predicting the residual signal according to the determined linear prediction coefficient, generating a second prediction signal by linearly predicting the output signal according to the determined linear prediction coefficient, estimating a path of the feedback signal according to an algorithm for canceling a feedback signal using the first and second prediction signals, and canceling the feedback signal from the sound signal using the estimated path of the feedback signal.

In another aspect, there is provided a computer-readable storage medium having stored therein program instructions to cause a processor to implement a method of canceling a feedback signal, the method including determining a linear prediction coefficient that is adaptively adjusted according to an input signal of an apparatus for reproducing sound, generating a first prediction signal by linearly predicting the input signal using the determined linear prediction coefficient, generating a second prediction signal by linearly predicting an output signal of the apparatus using the determined linear prediction coefficient, estimating a path of a feedback signal according to an algorithm for canceling a feedback signal using the first and second prediction signals, and canceling the feedback signal from the input signal using the estimated path of the feedback signal.

Other features and aspects may be apparent from the following detailed description, the drawings, and the claims.

Figure 1:
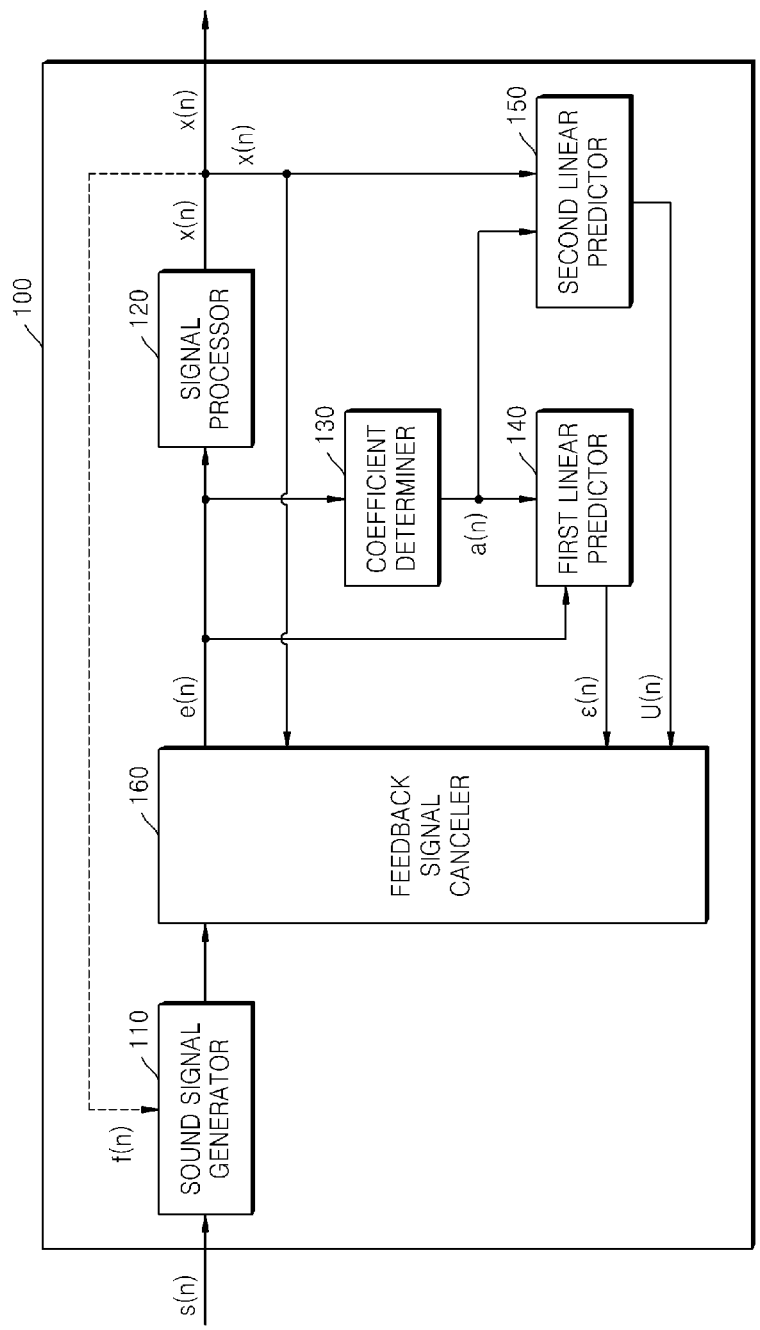
FIG. 1 is a diagram illustrating an example of an apparatus for reproducing sound.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of an apparatus for reproducing sound.

Referring to FIG. 1, apparatus 100 includes a sound signal generator 110, a signal processor 120, a coefficient determiner 130, a first linear predictor 140, a second linear predictor 150, and a feedback signal canceller 160.

The apparatus 100 of FIG. 1 shows elements related to the current example. Accordingly, it would be obvious to one of ordinary skill in the art that other general-purpose elements may be further included in the apparatus 100.

In this example, the signal processor 120, the coefficient determiner 130, the first linear predictor 140, the second linear predictor 150, and the feedback signal canceler 160 of the apparatus 100 of FIG. 1 may correspond to one or more processors. A processor may include an array of a plurality of logic gates, or in a combination of a general-purpose microprocessor and a memory storing a program that is executable in the general-purpose microprocessor. However, it would be obvious to one of ordinary skill in the art that the processor may be in other forms of hardware.

The apparatus 100 may include a hearing aid for amplifying and outputting peripheral sound. For example, the apparatus 100 may include a device used to reproduce sound in a relay, a telephone, a device for video conferencing, a communication device, and the like.

The apparatus 100 may reproduce sound obtained by canceling a feedback signal. For example, the feedback signal may be a signal wherein sound output from the apparatus 100 is fed back again to the apparatus 100.

For example, the feedback signal may denote a signal that is fed back as vibrations generated by a sound output unit (not shown) of the apparatus 100 and that is transmitted to the sound signal generator 110 through a housing of the apparatus 100.

As another example, if the apparatus 100 is a hearing aid, the feedback signal may denote a signal wherein a part of a signal output from the sound output unit of the apparatus 100 is fed back to the sound signal generator 110 through a small vent between an outer wall of the hearing aid and an ear of a user.

The apparatus 100 may cancel or otherwise reduce such a feedback signal so that a user of the apparatus 100 hears clearer sound.

The sound signal generator 110 may generate a sound signal by receiving sound around the apparatus 100. For example, the sound signal generator 110 may be a microphone that converts received sound to an electric signal, but is not limited thereto, and may be any device for recognizing and receiving surrounding sound.

The apparatus 100 may include a plurality of sound signal generators 110. Accordingly, if the apparatus 100 is a hearing aid, a sound signal generator 110 may be disposed in each of the right and left ears of the user.

The signal processor 120 may perform a process, according to functions of the apparatus 100, on a residual signal obtained by canceling the feedback signal from the sound signal generated by the sound signal generator 110. In this example, the residual signal may be an error signal. As an example, if the apparatus 100 is a hearing aid, the process according to the functions of the apparatus 100 may be a process of converting the sound signal to a digital signal, amplifying the digital signal, and reconverting the amplified digital signal to the sound signal.

In other words, if the apparatus 100 is used for a relay, the signal processor 120 may perform a process according to relaying functions on the residual signal.

The coefficient determiner 130 may determine a linear prediction coefficient that is adaptively adjusted according to the residual signal obtained by canceling the feedback signal from the sound signal. For example, the coefficient determiner 130 may be a lattice-based linear predictor, and may determine the linear prediction coefficient according to a Burg algorithm by receiving the residual signal.

As an example, the coefficient determiner 130 may determine the linear prediction coefficient so that the residual signal is minimized. As such, the coefficient determiner 130 may adaptively determine the linear prediction coefficient using the lattice-based linear predictor according to the Burg algorithm. An example of the coefficient determiner 130 is described with reference to FIG. 3.

The first linear predictor 140 may output a first prediction signal by linearly predicting the residual signal according to the linear prediction coefficient determined by the coefficient determiner 130. For example, the first linear predictor 140 may be a lattice-based or Levinson-Durbin-based linear predictor, but is not limited thereto.

For example, if the first linear predictor 140 linearly predicts a current residual signal using previously input residual signals, a linear prediction coefficient used for the linear prediction may be determined by the coefficient determiner 130. Accordingly, the first linear predictor 140 may perform a calculation represented by Equation 1 below.

$$\epsilon(n) = a^T(n)e(n) \quad \text{[Equation 1]}$$

In Equation 1, $\epsilon(n)$ denotes the first prediction signal that is predicted by the first linear predictor 140, $a(n)$ denotes the linear prediction coefficient that is determined by the coefficient determiner 130, and $e(n)$ denotes the residual signal. In other words, the first linear predictor 140 may output the first prediction signal $\epsilon(n)$ by linearly predicting the residual signal $e(n)$ according to the linear prediction coefficient $a(n)$ determined by the coefficient determiner 130. As another example, the first linear predictor 140 may predict and output the first prediction signal by considering an a priori error.

In Equation 1, n is an integer equal to or greater than 1, and $\epsilon(n)$, $e(n)$, and $a(n)$ are vector signals that are obtained by sampling a signal in terms of time. The description of n and the vector signals may be equally applied to following equations, and thus descriptions thereof will not be repeated.

An example of the structure of the first linear predictor 140 is described with reference to FIG. 4.

The second linear predictor 150 may output a second prediction signal by linearly predicting the sound signal that is processed by the signal processor 120, according to the linear prediction coefficient determined by the coefficient determiner 130. Here, the second linear predictor 150 may be a lattice-based or Levinson-Durbin-based linear predictor, but is not limited thereto.

For example, the second linear predictor 150 linear may predict a current output signal of the signal processor 120 using previously received output signals of the signal processor 120, according to the linear prediction coefficient determined by the coefficient determiner 130. Accordingly, the second linear predictor 150 may perform a calculation represented by Equation 2 below.

$$U(n) = a^T(n)x(n) \quad \text{[Equation 2]}$$

In Equation 2, $U(n)$ denotes the second prediction signal that is predicted by the second linear predictor 150, $a(n)$ denotes the linear prediction coefficient that is determined by the coefficient determiner 130, and $x(n)$ denotes the sound signal processed by the signal processor 120. In other words, the second linear predictor 150 may output the second prediction signal $U(n)$ by linearly predicting the sound signal $x(n)$ processed by the signal processor 120, according to the linear prediction coefficient $a(n)$ determined by the coefficient determiner 130.

An example of the structure of the second linear predictor 150 is described with reference to FIG. 5.

The feedback signal canceler 160 may estimate a path of the feedback signal according to an algorithm for canceling a feedback signal using the first prediction signal that is output from the first linear predictor 140 and the second prediction signal that is output from the second linear predictor 150, and may cancel the feedback signal from the sound signal generated by the sound signal generator 110 using the estimated path of the feedback signal.

For example, the algorithm for canceling the feedback signal may be a pseudo affine projection (PAP) algorithm or an affine projection (AP) algorithm, but is not limited thereto.

As another example, the algorithm for canceling the feedback signal may be a normalized least mean square (NLMS) algorithm or a prediction error method (PEM) algorithm. Such an algorithm may be applied to the feedback signal canceler 160.

For example, the path of the feedback signal estimated according to the PAP algorithm may be represented by Equation 3 below.

$$w(n+1) = w(n) + \mu \frac{U(n)}{\|U(n)\|^2} \varepsilon(n) \quad \text{[Equation 3]}$$

In Equation 3, $w(n+1)$ denotes the estimated path of the feedback signal, $\mu$ denotes a convergence constant, $\epsilon(n)$ denotes the first prediction signal that is output from the first linear predictor 140, $U(n)$ denotes the second prediction signal that is output from the second linear predictor 150, and $\|U(n)\|$ denotes a notation indicating a Euclidean vector norm.

Here, Equation 3 is only an example of the PAP algorithm, and thus the PAP algorithm is not limited thereto.

The PAP algorithm of Equation 3 is the same as a general PAP algorithm, except that the first prediction signal $\epsilon(n)$ that is output from the first linear predictor 140 and the second prediction signal $U(n)$ that is output from the second linear predictor 150 are used as parameters. In other words, the PAP algorithm used by the feedback signal canceler 160 is the same as the general PAP algorithm except that the parameters $\epsilon(n)$ and $U(n)$ are signals that passed through the first linear predictor 140 according to the linear prediction coefficient determined by the coefficient determiner 130, and the second linear predictor 150 according to the linear prediction coefficient determined by the coefficient determiner 130, respectively. Because the feedbacks signal canceler 160 estimates the path of the feedback signal using the first prediction signal that is output from the first linear predictor 140 according to the linear prediction coefficient determined by the coefficient determiner 130, a weight about characteristics of a current signal may be largely applied to the estimated path of the feedback signal. Accordingly, the feedback signal canceler 160 may stably cancel the feedback signal.

Figure 2:
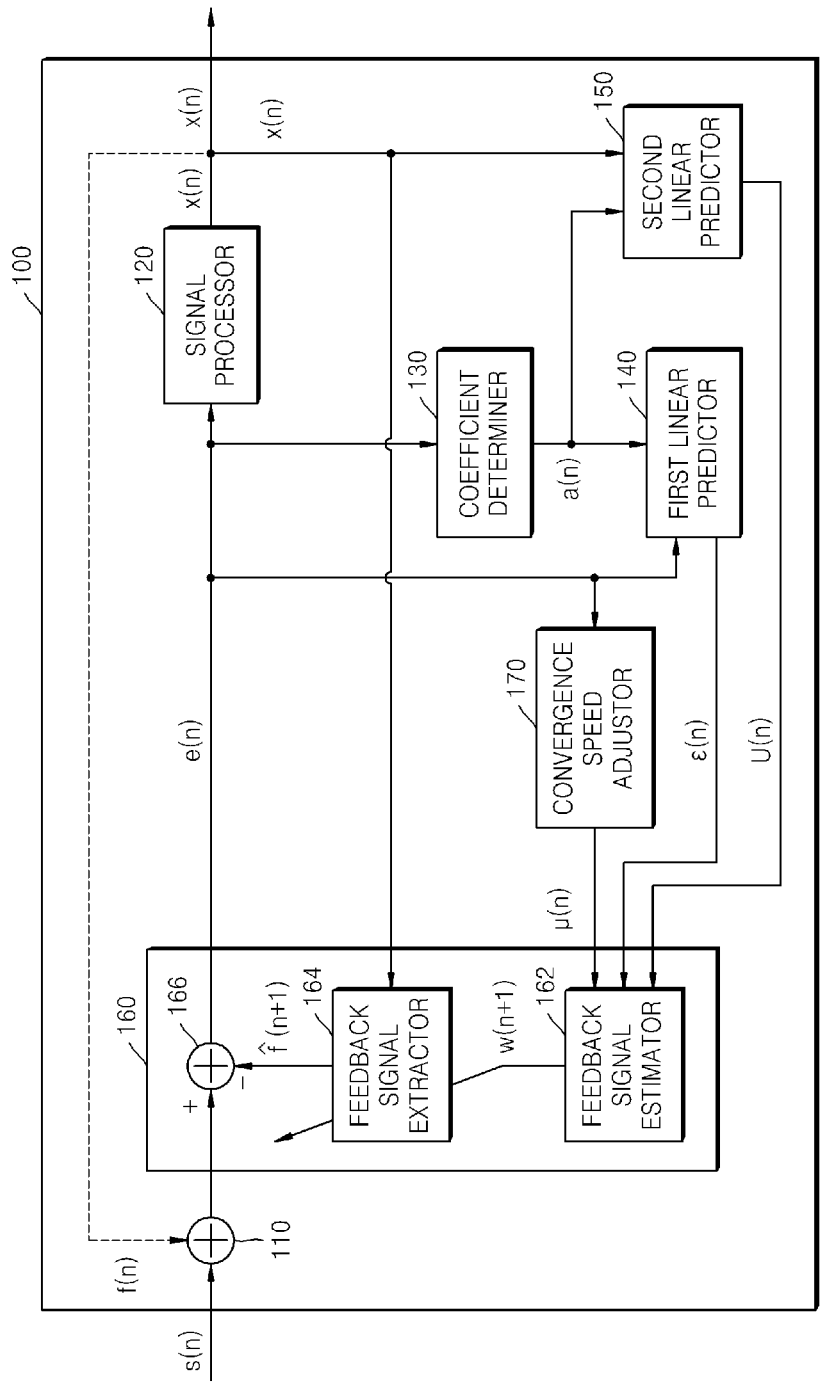
FIG. 2 is a diagram illustrating another example of the apparatus of FIG. 1.

FIG. 2 illustrates another example of an apparatus for reproducing sound.

Referring to FIG. 2, apparatus 100 includes the sound signal generator 110, the signal processor 120, the coefficient determiner 130, the first linear predictor 140, the second linear predictor 150, the feedback signal canceler 160, and a convergence speed adjustor 170. In this example, the feedback signal canceler 160 includes a feedback signal estimator 162, a feedback signal extractor 164, and a residual signal generator 166.

The apparatus 100 may further include other general-purpose elements. Also, the signal processor 120, the coefficient determiner 130, the first linear predictor 140, the second linear predictor 150, the feedback signal canceler 160, and the convergence speed adjustor 170 may be realized in one or more processors.

The apparatus 100 of FIG. 2 is another example of the apparatus 100 of FIG. 1. Accordingly, the elements of the apparatus 100 are not limited to those shown in FIG. 2. Also, descriptions related to FIG. 1 are applicable to the apparatus 100 of FIG. 2, and thus additional explanation thereof will not be repeated here.

The sound signal generator 110 may generate the sound signal by receiving sound around the apparatus 100. The signal processor 120 may perform the process according to the functions of the apparatus 100 on the residual signal that is obtained by canceling the feedback signal from the sound signal. The coefficient determiner 130 may determine the linear prediction coefficient that is adaptively adjusted according to the residual signal. The first linear predictor 140 may output the first prediction signal by linearly predicting the residual signal according to the linear prediction coefficient determined by the coefficient determiner 130. The second linear predictor 150 may output the second prediction signal by linearly predicting the sound signal processed by the signal processor 120, according to the linear prediction coefficient determined by the coefficient determiner 130.

The feedback signal canceler 160 may estimate the path of the feedback signal according to the algorithm for canceling a feedback signal using the first and second prediction signals. Accordingly, the feedback signal canceler 160 may cancel the feedback signal from the sound signal generated by the sound signal generator 110 using the estimated path of the feedback signal.

The feedback signal estimator 162 may estimate the path of the feedback signal using the first prediction signal output from the first linear predictor 140 and the second prediction signal output from the second linear predictor 150. For example, the feedback signal estimator 162 may estimate the path of the feedback signal according to Equation 3 above, according to the PAP algorithm.

The feedback signal extractor 164 may extract the feedback signal from the sound signal that is processed by the signal processor 120 using the path of the feedback signal that is estimated by the feedback signal estimator 162. For example, the feedback signal extractor 164 may be an adaptive filter. Accordingly, the feedback signal extractor 164 may be an adaptive filter for updating a coefficient according to the path of the feedback signal estimated by the feedback signal estimator 162.

The residual signal generator 166 may generate the residual signal by canceling the feedback signal that is extracted by the feedback signal extractor 164 from the sound signal generated by the sound signal generator 110.

Accordingly, the feedback signal canceler 160 may cancel the feedback signal of the apparatus 100.

The convergence speed adjustor 170 may adaptively adjust a convergence speed of the feedback signal extractor 164 according to an autocorrelation of the residual signal. The convergence speed may be a step size.

For example, the convergence speed adjustor 170 may adjust the convergence speed using a ratio of a first autocorrelation at a first time difference to a second autocorrelation at a second time difference. Here, the time difference may be also referred to as a time delay.

For example, the convergence speed adjustor 170 may adjust the convergence speed using a ratio of an autocorrelation of a residual signal when a time difference is 0 to an autocorrelation of a residual signal when a time difference is 1. For example, the autocorrelation of the residual signal when the time difference is 0 and the autocorrelation of the residual signal when the time difference is 1 may be represented by Equations 4 and 5, respectively.

$$p(n)=\lambda p(n-1)+(1-\lambda)e^2(n) \qquad \text{[Equation 4]}$$

$$q(n)=\lambda q(n-1)+(1-\lambda)e(n)e(n-1) \qquad \text{[Equation 5]}$$

In Equations 4 and 5, p(n) denotes the autocorrelation of the residual signal when the time difference is 0, e(n) denotes the residual signal, and q(n) denotes the autocorrelation of the residual signal when the time difference is 1. Also, $\lambda$ is a value that is obtained via experiments, and may be 0.1, but is not limited thereto.

Accordingly, the ratio of the autocorrelation of the residual signal when the time difference is 0 to the autocorrelation of the residual signal when the time difference is 1, which is a correlation factor used by the convergence speed adjustor 170 to adjust the convergence speed of the feedback signal extractor 164, may be represented by Equation 6 below.

$$v(n) = \frac{q^2(n)}{p^2(n)} \qquad \text{[Equation 6]}$$

In Equation 6, v(n) denotes the correlation factor, p(n) denotes the autocorrelation of the residual signal when the time difference is 0, and q(n) denotes the autocorrelation of the residual signal when the time difference is 1.

Accordingly, the convergence speed adjustor 170 may adjust the convergence speed using a sigmoid function according to the ratio of the first autocorrelation at the first time difference to the second autocorrelation at the second time difference. In this example, the convergence speed adjustor 170 may adjust the convergence speed using the sigmoid function according to the correlation factor, which may be represented by Equation 7 below.

$$\mu(n)=f[1-v(n)] \qquad \text{[Equation 7]}$$

In Equation 7, $\mu(n)$ denotes a variable convergence constant, $f[\cdot]$ denotes the sigmoid function, and v(n) denotes the correlation factor.

If a signal having high correlation is input to the apparatus 100, a value of the correlation factor v(n) may be close to 0, and when a signal having low correlation is input to the apparatus 100, the value of the correlation factor v(n) may be close to 1. As such, using the correlation factor having a linear characteristic from 0 to 1 as the convergence constant, the convergence speed adjustor 170 may enable the convergence constant to be small by using the sigmoid function, when a colored signal having high correlation is input.

An example of a variable convergence constant having a sigmoid function is described with reference to FIG. 6.

The convergence speed adjustor 170 may output the variable convergence constant μ(n) to the feedback signal estimator 162, and the feedback signal estimator 162 may use the variable convergence constant μ(n) to adaptively adjust the convergence speed of the feedback signal extractor 164.

Accordingly, the path of the feedback signal estimated by the feedback signal estimator 162 according to the PAP algorithm may be represented by Equation 8 below.

$$w(n+1) = w(n) + \mu(n)\frac{U(n)}{\|U(n)\|^2}\varepsilon(n) \quad \text{[Equation 8]}$$

In Equation 8, w(n+1) denotes the estimated path of the feedback signal, μ(n) denotes the variable convergence constant, ε(n) denotes the first prediction signal that is output from the first linear predictor 140, U(n) denotes the second prediction signal that is output from the second linear predictor 150, and □·□ denotes a notation *indicating a Euclidean vector norm.

Equation 8 is the same as Equation 3, except that the variable convergence constant μ(n) is used, and thus further description thereof will not be repeated here.

If a signal having a colored characteristic and high correlation is input to the apparatus 100, the convergence speed adjustor 170 may output a convergence constant that has a low convergence speed to the feedback signal estimator 162. If a signal having a white noise characteristic and low correlation is input to the apparatus 100, the convergence speed adjustor 170 may output a convergence constant that has a high convergence speed to the feedback signal estimator 162. Accordingly, the apparatus 100 may quickly estimate the path of the feedback signal while minimizing distortion of the input sound signal.

If the apparatus 100 is a hearing aid, the PAP algorithm suitable for a low power digital hearing aid may be used while reducing a throughput. Also, the apparatus 100 may stably, quickly, and accurately estimate the path of the feedback signal while using the variable convergence constant, and thus, distortion of an input signal may be minimized according to characteristics of the input signal.

Figure 3:
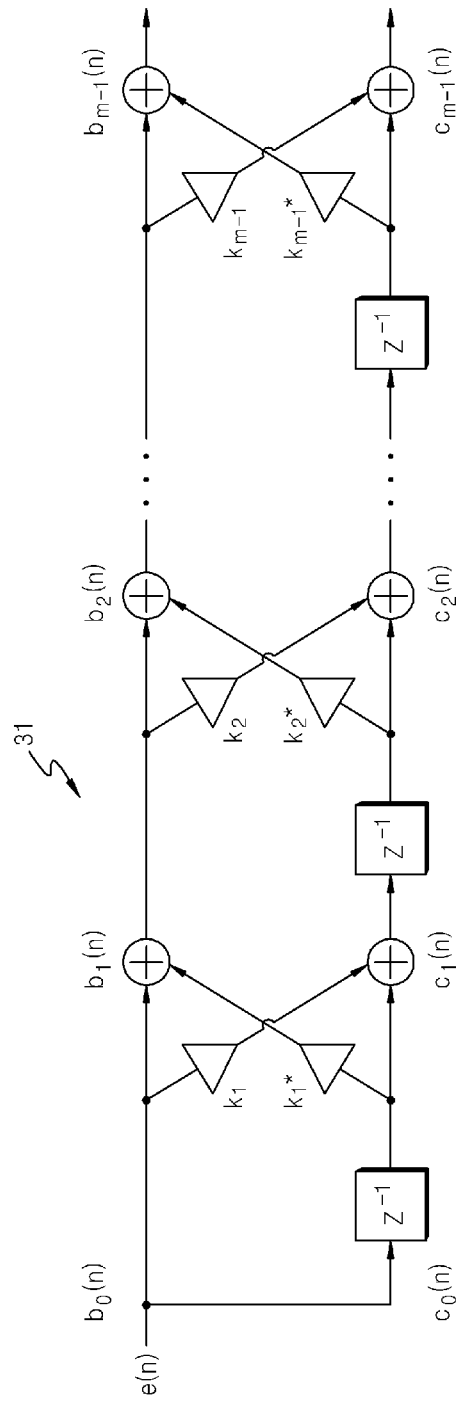
FIG. 3 is a diagram illustrating an example of a coefficient determiner.

FIG. 3 illustrates an example of a coefficient determiner.

Referring to FIG. 3, a lattice-based m−1th linear predictor 31 is shown as an example of the coefficient determiner 130.

The coefficient determiner 130 according to the current embodiment of the may receive the residual signal e(n) to predict an output signal $b_{m-1}(n)$ and may determine linear prediction coefficients $K_1$ through $K_{m-1}*$. In this example, the linear prediction coefficients $K_1$ through $K_{m-1}*$ may be also referred to as reflection coefficients. The linear prediction coefficients $K_1$ through $K_{m-1}*$ may each correspond to a(n) defined in Equations 1 and 2.

The coefficient determiner 130 may adaptively adjust and determine the linear prediction coefficient using the Burg algorithm according to the residual signal. For example, the coefficient determiner 130 may receive the residual signal e(n) and determine the linear prediction coefficients $K_1$ through $K_{m-1}*$ such that the residual signal e(n) is minimized according to the Burg algorithm.

The linear prediction coefficients $K_1$ through $K_{m-1}*$ determined by the coefficient determiner 130 may be transmitted to the first and second linear predictors 140 and 150. The first and second linear predictors 140 and 150 may respectively predict the first and second prediction signals according to the linear prediction coefficients $K_1$ through $K_{m-1}*$.

As such, because the coefficient determiner 130 may adaptively determine the linear prediction coefficient such that the residual signal e(n) is minimized as the residual signal e(n) changes, accuracy of estimating the path of the feedback signal may be improved since characteristics of a current signal are largely reflected.

Figure 4:
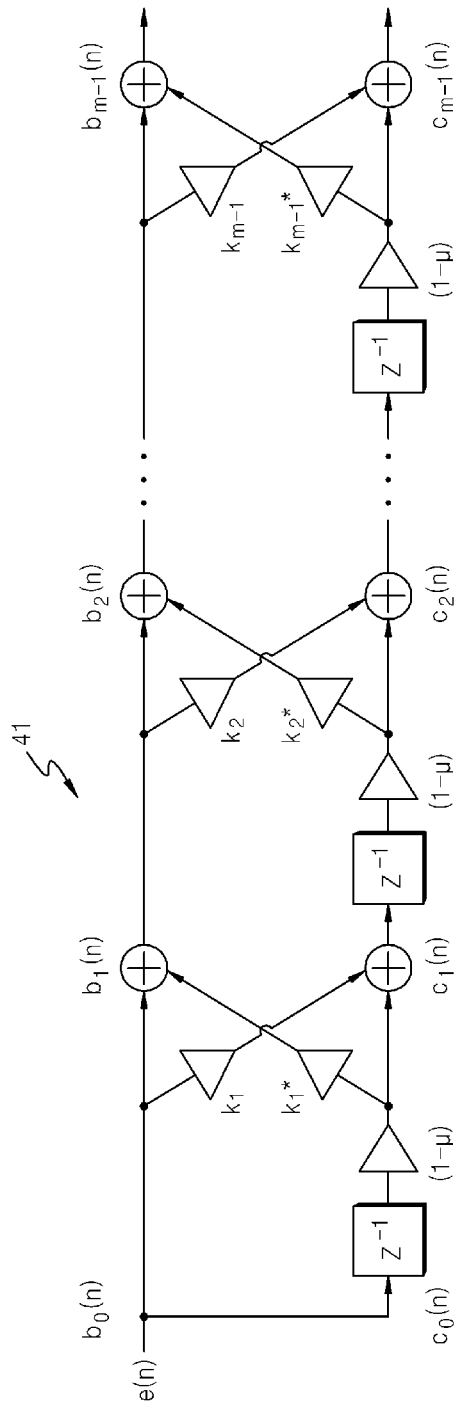
FIG. 4 is a diagram illustrating an example of a first linear predictor.

FIG. 4 illustrates an example of a first linear predictor.

Referring to FIG. 4, a lattice-based m−1th linear predictor 41 is shown as an example of the first linear predictor 140.

The first linear predictor 140 according to the current embodiment may receive the residual signal e(n) to predict the output signal $b_{m-1}(n)$ according to the linear prediction coefficients $K_1$ through $K_{m-1}*$ that are determined by the coefficient determiner 130. In this example, the linear prediction coefficients $K_1$ through $K_{m-1}*$ determined by the coefficient determiner 130 may be a(n) of Equation 1, and the output signal $b_{m-1}(n)$ may be the first prediction signal ε(n).

In this example, the first linear predictor 140 is the lattice-based m−1th linear predictor 41 considering an a priori error. Thus, the first prediction signal output from the lattice-based m−1th linear predictor 41 may be represented by Equation 9 below.

$$\varepsilon(n)=a_\mu^T(n)\cdot e(n)=(\Sigma_\mu a(n))^T\cdot e(n) \quad \text{[Equation 9]}$$

In Equation 9, ε(n) denotes the first prediction signal that is predicted by the lattice-based m−1th linear predictor 41, a(n) denotes the linear prediction coefficient that is determined by the coefficient determiner 130, and e(n) denotes the residual signal. Also, $\Sigma_\mu$ in Equation 9 may be represented by Equation 10 below.

$$\Sigma_\mu = \text{diag}\{(1-\mu), (1-\mu)^2, \ldots, (1-\mu)^{m-1}\} = \begin{bmatrix} 1-\mu & 0 & \cdots & 0 \\ 0 & (1-\mu)^2 & & \vdots \\ \vdots & & \ddots & 0 \\ 0 & \cdots & 0 & (1-\mu)^{m-1} \end{bmatrix} \quad \text{[Equation 10]}$$

In Equation 10, μ denotes a convergence coefficient in an adaptive algorithm. In this example, μ denotes the convergence constant that is used in Equation 3 or the variable convergence constant that is defined in Equation 7.

Accordingly, the lattice-based m−1th linear predictor 41 considering the a priori error may predict and output the first prediction signal ε(n).

Accordingly, because the first linear predictor 140 linear predicts the first prediction signal by considering the a priori error, the apparatus 100 may stably cancel the feedback signal.

Figure 5:
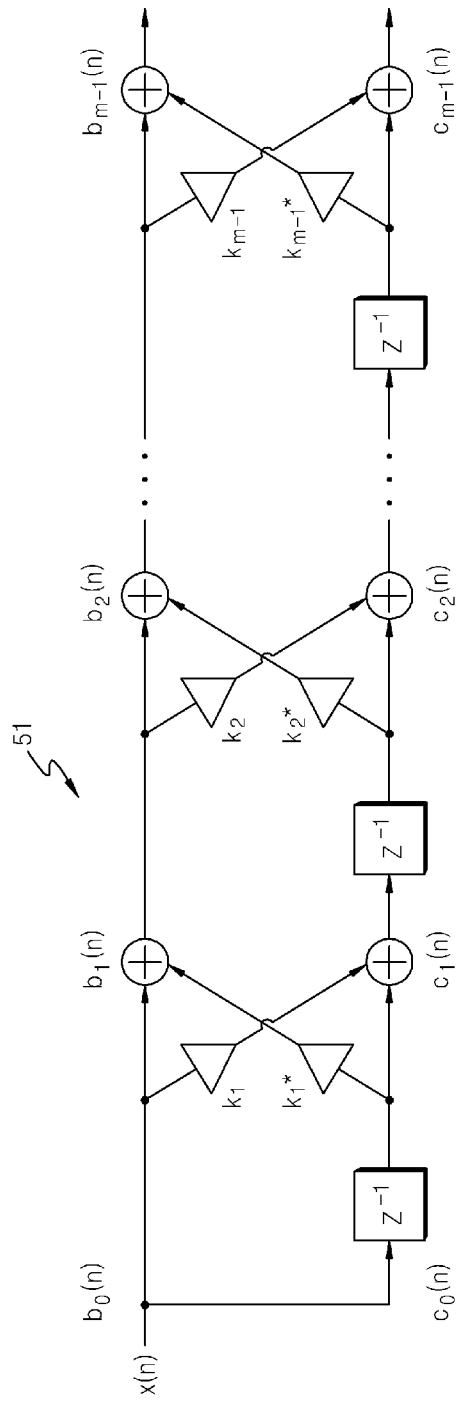
FIG. 5 is a diagram illustrating an example of a second linear predictor.

FIG. 5 illustrates an example of a second linear predictor.

Referring to FIG. 5, a lattice-based m−1th linear predictor 51 is shown as an example of the second linear predictor 150.

The second linear predictor 150 according to the current embodiment may receive the sound signal x(n) that passed through the signal processor 120, and predict the output signal $b_{m-1}(n)$ according to the linear prediction coefficients $K_1$ through $K_{m-1}*$ determined by the coefficient determiner 130. In this example, the linear prediction coefficients $K_1$ through $K_{m-1}*$ determined by the coefficient determiner 130 may be a(n) of Equation 2, and the output signal $b_{m-1}(n)$ may be the second prediction signal U(n).

Figure 6:
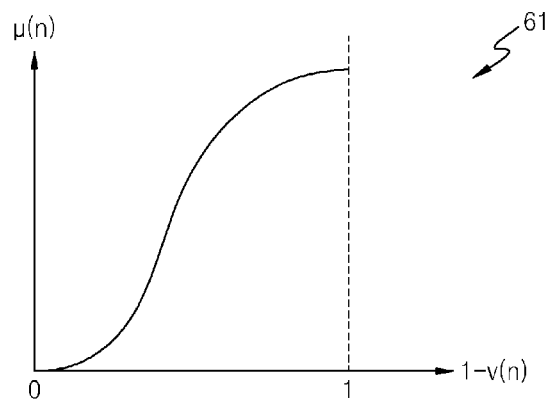
FIG. 6 is a graph illustrating an example of a variable convergence constant having a sigmoid function form.

FIG. 6 is a graph illustrating a variable convergence constant μ(n) having a sigmoid function form.

Referring to FIGS. 2 and 6, as defined in Equation 7, the convergence speed adjustor 170 may adjust the variable convergence constant μ(n) using the sigmoid function according to the ratio v(n) of the first autocorrelation at the first time difference to the second autocorrelation at the second time difference. Accordingly, the convergence speed adjustor 170 may adaptively adjust the convergence speed of the feedback signal extractor 164.

If a signal having a colored characteristic and high correlation is input to the apparatus 100, the convergence speed adjustor 170 may output a convergence constant that has a low convergence speed to the feedback signal estimator 162, and if a signal having a white noise characteristic and low correlation is input to the apparatus 100, the convergence speed adjustor 170 may output a convergence constant that has a high convergence speed to the feedback signal estimator 162. Accordingly, the apparatus 100 may quickly estimate the path of the feedback signal while minimizing distortion of the input sound signal.

Figure 7:
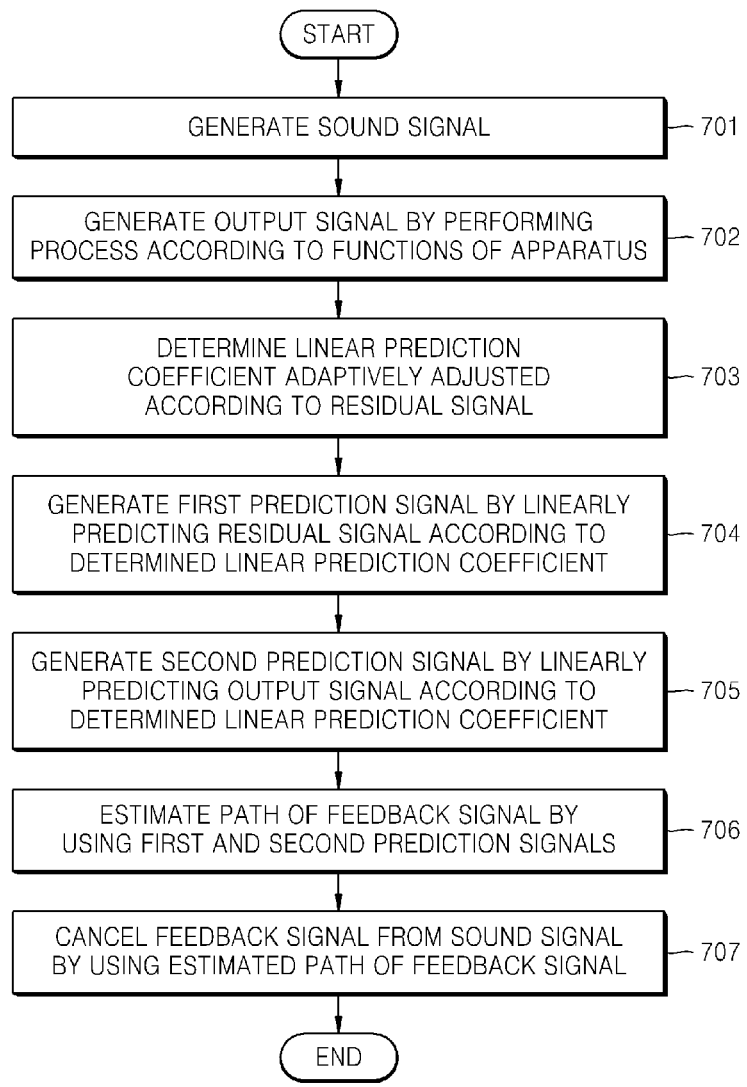
FIG. 7 is a flowchart illustrating an example a method of reproducing sound.

FIG. 7 illustrates an example of a method of reproducing sound.

Referring to FIG. 7, the method includes operations that may be processed in time series by the apparatus 100. Accordingly, the examples described with reference to the apparatus 100 may be equally applied to the method of FIG. 7, even if they are not described.

In 701, the sound signal generator 110 generates the sound signal by receiving the sound around the apparatus 100. For example, 701 may be performed using a microphone that is included in the apparatus 100.

In 702, the signal processor 120 generates the output signal by performing a process according to the functions of the apparatus 100, on the residual signal that is obtained by canceling the feedback signal from the sound signal generated in 701. Here, the generated output signal may be the sound signal on which the signal processing is performed by the signal processor 120.

In 703, the coefficient determiner 130 determines the linear prediction coefficient that is adaptively adjusted according to the residual signal. For example, 703 may be performed using a lattice-based linear predictor according to a Burg algorithm.

In 704, the first linear predictor 140 generates the first prediction signal by linearly predicting the residual signal according to the linear prediction coefficient determined in 703. For example, 704 may be performed by a lattice-based or Levinson-Durbin-based linear predictor.

In 705, the second linear predictor 150 generates the second prediction signal by linearly predicting the output signal generated in 702 according to the linear prediction coefficient determined in 703. For example, 705 may be performed by a lattice-based or Levinson-Durbin-based linear predictor.

In 706, the feedback signal estimator 162 estimates the path of the feedback signal according to the algorithm for canceling a feedback signal using the first prediction signal generated in 704 and the second prediction signal generated in 705. For example, the algorithm for canceling the feedback signal may be a PAP algorithm.

In 707, the feedback signal extractor 164 and the residual signal generator 166 cancel the feedback signal from the sound signal using the path of the feedback signal estimated in 706. For example, 707 may be performed by extracting the feedback signal using an adaptive filter and generating the residual signal by canceling the extracted feedback signal from the output signal.

Accordingly, the apparatus 100 may generate sound in which the feedback signal is stably and cleanly canceled.

Figure 8:
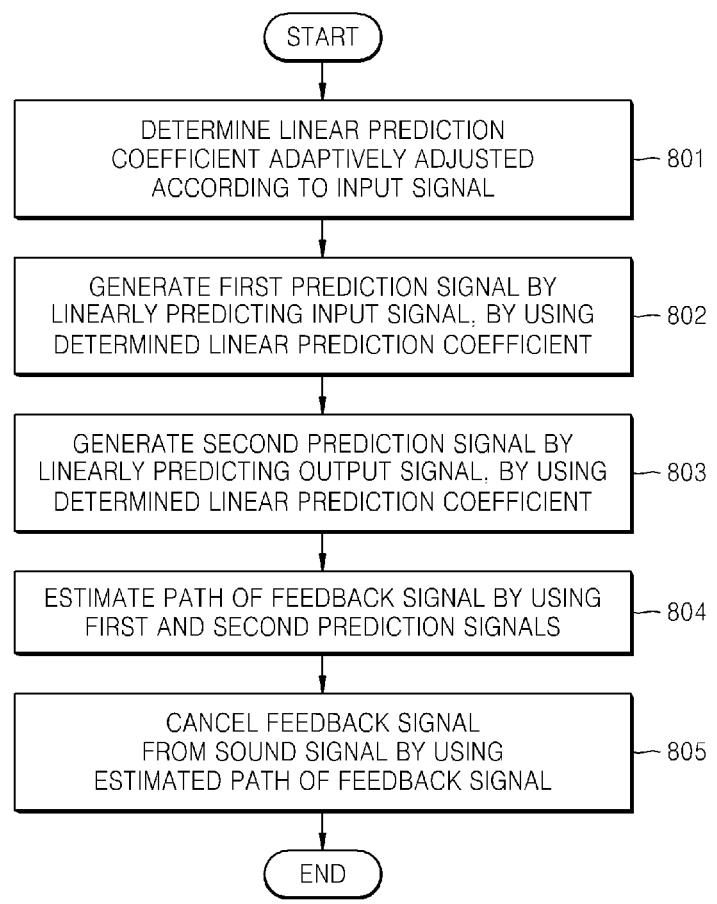
FIG. 8 is a flowchart illustrating an example of a method of canceling a feedback signal.

FIG. 8 illustrates an example of a method of canceling a feedback signal. The method may be used to cancel a feedback signal in the apparatus 100 of FIG. 1 or 2.

Referring to FIG. 8, the method may include operations processed in time series by the apparatus 100. Accordingly, the examples described with reference to the apparatus 100 may be equally applied to the method of FIG. 8, even if they are not described.

In 801, the coefficient determiner 130 determines the linear prediction coefficient that is adaptively adjusted according to the input signal of the apparatus 100. For example, the input signal of the apparatus 100 may include any signal that is input to the apparatus 100. Also, 801 may be performed using a lattice-based linear predictor according to a Burg algorithm.

In 802, the first linear predictor 140 generates the first prediction signal by linearly predicting the input signal of the apparatus 100, according to the linear prediction coefficient determined in 801. For example, the first linear predictor 140 may be disposed at an input terminal of the apparatus 100. For example, 802 may be performed using a lattice-based or Levinson-Durbin-based linear predictor.

In 803, the second linear predictor 150 generates the second prediction signal by linearly predicting an output signal of the apparatus 100, according to the linear prediction coefficient determined in 801. For example, the second linear predictor 150 may be disposed at an output terminal of the apparatus 100. For example, 803 may be performed by a lattice-based or Levinson-Durbin-based linear predictor.

In 804, the feedback signal estimator 162 estimates the path of the feedback signal according to an algorithm for canceling a feedback signal, using the first prediction signal generated in 802 and the second prediction signal generated in 803. For example, the algorithm for canceling the feedback signal may be a PAP algorithm.

In 805, the feedback signal extractor 164 and the residual signal generator 166 cancels the feedback signal from the input signal of the apparatus 100 using the path of the feedback signal estimated in 804. For example, 805 may be performed by extracting the feedback signal using an adaptive filter, and generating the residual signal by canceling the extracted feedback signal from the output signal.

Accordingly, the apparatus 100 may stably and cleanly cancel the feedback signal.

In various examples the apparatus 100 has a simple structure, has stable convergence performance, and quickly and accurately estimates the path of the feedback signal. Accordingly, the apparatus 100 may minimize sound distortion in the input signal, and stably cancel the feedback signal.

As described herein, according to one or more embodiments, a feedback signal can be stably cancelled without distortion of an input signal using a plurality of linear predictors.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as readonly memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for reproducing sound, the apparatus comprising:
    a sound signal generator configured to generate a sound signal by receiving sound from around the apparatus;
    a signal processor configured to perform a process on a residual signal that is obtained by canceling a feedback signal from the sound signal;
    a coefficient determiner configured to determine a linear prediction coefficient that is adaptively adjusted according to the residual signal;
    a first linear predictor configured to output a first prediction signal by linearly predicting the residual signal according to the determined linear prediction coefficient;
    a second linear predictor configured to output a second prediction signal by linearly predicting the sound signal that is processed by the signal processor, according to the determined linear prediction coefficient; and
    a feedback signal canceler configured to estimate a path of the feedback signal according to an algorithm for canceling a feedback signal using the first and second prediction signals, and to cancel the feedback signal from the sound signal generated by the sound signal generator using the estimated path of the feedback signal,
    wherein the feedback signal canceller comprises:
        a feedback signal estimator configured to estimate the path of the feedback signal using the first and second prediction signals;
        a feedback signal extractor configured to extract the feedback signal from the sound signal that is processed by the signal processor, using the estimated path of the feedback signal; and
        a convergence speed adjustor configured to adaptively adjust a convergence speed of the feedback signal extractor according to an autocorrelation of the residual signal, and
    wherein the convergence speed adjustor is configured to adjust the convergence speed using a ratio of a first autocorrelation at a first time difference to a second autocorrelation at a second time difference.

2. The apparatus of claim 1, wherein the algorithm for canceling the feedback signal comprises a pseudo affine projection (PAP) algorithm.

3. The apparatus of claim 1, wherein the feedback signal canceler further comprises
    a residual signal generator configured to generate the residual signal by canceling the extracted feedback signal from the sound signal generated by the sound signal generator.

4. The apparatus of claim 1, wherein the feedback signal extractor is an adaptive filter that updates a coefficient according to the path of the feedback signal estimated by the feedback signal estimator.

5. The apparatus of claim 1, wherein at least one of the coefficient determiner, the first linear predictor, and the second linear predictor comprises a lattice-based linear predictor.

6. The apparatus of claim 5, wherein the first linear predictor is configured to output the first prediction signal by considering an a priori error.

7. The apparatus of claim 5, wherein the coefficient determiner is configured to determine the linear prediction coefficient according to a Burg algorithm.

8. The apparatus of claim 1, wherein the convergence speed adjustor is configured to adjust a convergence speed using a sigmoid function according to the ratio of the first autocorrelation at the first time difference to the second autocorrelation at the second time difference.

9. A method of reproducing sound in an apparatus for reproducing sound, the method comprising:
    generating a sound signal by receiving sound from around the apparatus;
    generating an output signal by performing a process on a residual signal that is obtained by canceling a feedback signal from the sound signal;
    determining a linear prediction coefficient that is adaptively adjusted according to the residual signal;
    generating a first prediction signal by linearly predicting the residual signal according to the determined linear prediction coefficient;
    generating a second prediction signal by linearly predicting the output signal according to the determined linear prediction coefficient;
    estimating a path of the feedback signal according to an algorithm for canceling a feedback signal using the first and second prediction signals;
    extracting the feedback signal from the output signal using the estimated path of the feedback signal; and
    canceling the feedback signal from the sound signal using the estimated path of the feedback signal,
    wherein the extracting of the feedback signal is performed using an adaptive filter, and the method further comprises adaptively adjusting a convergence speed of the adaptive filter according to an autocorrelation of the residual signal,
    wherein the adaptive adjusting of the convergence speed of the adaptive filter comprises adjusting the convergence speed using a ratio of the first autocorrelation at a first time difference to a second autocorrelation at a second time difference.

10. The method of claim 9, wherein the algorithm for canceling the feedback signal comprises a pseudo affine projection (PAP) algorithm.

11. The method of claim 9, wherein the canceling of the feedback signal further comprises generating the residual signal by canceling the extracted feedback signal from the sound signal.

12. The method of claim 9, wherein at least one of the determining of the linear prediction coefficient, the generating of the first prediction signal, and the generating of the first prediction signal is performed using a lattice-based linear predictor.

13. The method of claim 12, wherein the generating of the first prediction signal is performed using a lattice-based linear predictor by considering an a priori error.

14. The method of claim 12, wherein the determining of the linear prediction coefficient is performed according to a Burg algorithm.

15. A method of canceling a feedback signal, the method comprising:
  determining a linear prediction coefficient that is adaptively adjusted according to an input signal of an apparatus for reproducing sound;
  generating a first prediction signal by linearly predicting the input signal using the determined linear prediction coefficient;
  generating a second prediction signal by linearly predicting an output signal of the apparatus using the determined linear prediction coefficient;
  estimating a path of a feedback signal according to an algorithm for canceling a feedback signal using the first and second prediction signals;
  extracting the feedback signal from the output signal using the estimated path of the feedback signal; and
  canceling the feedback signal from the input signal using the estimated path of the feedback signal,
  wherein the extracting of the feedback signal is performed using an adaptive filter, and the method further comprises adaptively adjusting a convergence speed of the adaptive filter according to an autocorrelation of the residual signal,
  wherein the adaptive adjusting of the convergence speed of the adaptive filter comprises adjusting the convergence speed using a ratio of a first autocorrelation at a first time difference to a second autocorrelation at a second time difference.

16. A non-transitory computer-readable storage medium having stored therein program instructions to cause a processor to implement a method of reproducing sound in an apparatus for reproducing sound, the method comprising:
  generating a sound signal by receiving sound from around the apparatus;
  generating an output signal by performing a process on a residual signal that is obtained by canceling a feedback signal from the sound signal;
  determining a linear prediction coefficient that is adaptively adjusted according to the residual signal;
  generating a first prediction signal by linearly predicting the residual signal according to the determined linear prediction coefficient;
  generating a second prediction signal by linearly predicting the output signal according to the determined linear prediction coefficient;
  estimating a path of the feedback signal according to an algorithm for canceling a feedback signal using the first and second prediction signals;
  extracting the feedback signal from the output signal using the estimated path of the feedback signal; and
  canceling the feedback signal from the sound signal using the estimated path of the feedback signal,
  wherein the extracting of the feedback signal is performed using an adaptive filter, and the method further comprises adaptively adjusting a convergence speed of the adaptive filter according to an autocorrelation of the residual signal,
  wherein the adaptive adjusting of the convergence speed of the adaptive filter comprises adjusting the convergence speed using a ratio of a first autocorrelation at a first time difference to a second autocorrelation at a second time difference.

17. A non-transitory computer-readable storage medium having stored therein program instructions to cause a processor to implement a method of canceling a feedback signal, the method comprising:
  determining a linear prediction coefficient that is adaptively adjusted according to an input signal of an apparatus for reproducing sound;
  generating a first prediction signal by linearly predicting the input signal using the determined linear prediction coefficient;
  generating a second prediction signal by linearly predicting an output signal of the apparatus using the determined linear prediction coefficient;
  estimating a path of a feedback signal according to an algorithm for canceling a feedback signal using the first and second prediction signals
  extracting the feedback signal from the output signal using the estimated path of the feedback signal; and
  canceling the feedback signal from the input signal using the estimated path of the feedback signal,
  wherein the extracting of the feedback signal is performed using an adaptive filter, and the method further comprises adaptively adjusting a convergence speed of the adaptive filter according to an autocorrelation of the residual signal,
  wherein the adaptive adjusting of the convergence speed of the adaptive filter comprises adjusting the convergence speed using a ratio of a first autocorrelation at a first time difference to a second autocorrelation at a second time difference.

* * * * *